United States Patent
Herrmann et al.

(10) Patent No.: US 6,786,295 B2
(45) Date of Patent: Sep. 7, 2004

(54) SUPPORT STRUCTURE FOR A COMMERCIAL MOTOR VEHICLE

(75) Inventors: Roland Herrmann, Altenriet (DE); Wolfgang Pedrotti, Ostfildern (DE); Wolfgang Seidl, Marbach (DE)

(73) Assignee: DaimlerChrysler AG, Stuttgart (DE)

( * ) Notice: Subject to any disclaimer, the term of this patent is extended or adjusted under 35 U.S.C. 154(b) by 87 days.

(21) Appl. No.: 10/278,467

(22) Filed: Oct. 23, 2002

(65) Prior Publication Data

US 2003/0075894 A1 Apr. 24, 2003

(30) Foreign Application Priority Data

Oct. 23, 2001 (DE) ......................................... 101 52 184

(51) Int. Cl.[7] .............................................. B62D 21/00
(52) U.S. Cl. ............................... 180/312; 280/124.109; 296/193.09; 296/203.02
(58) Field of Search ..................... 280/124.109, 785; 180/299, 312; 296/193.09, 203.02, 204

(56) References Cited

U.S. PATENT DOCUMENTS

| | | | | |
|---|---|---|---|---|
| 2,997,122 A | * | 8/1961 | Frey et al. ................... 180/312 |
| 4,593,786 A | * | 6/1986 | Tate ............................. 180/291 |
| 4,811,812 A | * | 3/1989 | Cassese ....................... 180/295 |
| 4,813,704 A | * | 3/1989 | Smith .......................... 280/788 |
| 5,280,957 A | * | 1/1994 | Hentschel et al. ........... 280/788 |
| 6,138,786 A | * | 10/2000 | Anderson et al. ........... 280/785 |
| 6,398,262 B1 | * | 6/2002 | Ziech et al. ................. 280/785 |
| 6,470,991 B1 | * | 10/2002 | Bowman et al. ....... 280/124.109 |
| 2002/0113394 A1 | * | 8/2002 | Ziech et al. ........... 280/124.09 |
| 2003/0047907 A1 | * | 3/2003 | Hicks et al. ............. 280/438.1 |

FOREIGN PATENT DOCUMENTS

| | | |
|---|---|---|
| DE | 42 28 314 | 3/1994 |
| DE | 42 34 138 | 4/1994 |
| DE | 198 09 209 | 9/1999 |

* cited by examiner

*Primary Examiner*—Paul N. Dickson
*Assistant Examiner*—Laura B. Rosenberg
(74) *Attorney, Agent, or Firm*—Klaus J. Bach

(57) ABSTRACT

In a support structure for a commercial motor vehicle including two longitudinal frame members between which a drive unit including an internal combustion engine and a transmission is arranged and wherein the support structure has an independent wheel suspension for each of the vehicles front wheels, each with an upper A-arm and a lower A-arm mounted to the support structure for supporting the front wheels, a support unit is provided which, in front and behind a space for receiving the drive unit extends around the longitudinal frame members and is fastened to the longitudinal frame members and on which at least the lower A-arms are mounted.

15 Claims, 3 Drawing Sheets

SUPPORT STRUCTURE FOR A COMMERCIAL MOTOR VEHICLE

The present invention relates to a supporting structure for a commercial motor vehicle, in particular for a truck including two spaced longitudinally extending frame members between which a drive unit with an internal combustion engine and a transmission is supported and which includes an independent front wheel suspension with upper and lower control arms.

A support structure of this type is disclosed, for example, in DE 42 34 138 A1 and has two spaced vehicle frame members extending parallel to each other in the longitudinal direction of the vehicle. Between these longitudinal frame members, a drive unit including an internal combustion engine and gearbox is arranged in a front region of the support structure. The support structure includes an independent wheel suspension with upper A-arms and lower A-arms for two supporting front-axle wheels. A front cross-member and a rear cross-member are fastened to the longitudinal frame members in front and behind the front axle, with regard to the longitudinal direction of the vehicle, and a first and a second strut of the lower A-arm are mounted on the cross-members, at each side of the vehicle. The upper A-arms are mounted by their struts each on one of the longitudinal frame members. At their front end, with regard to the longitudinal direction of the vehicle, the longitudinal members are each extended forwardly by means of a support console, to which a lower front cross-member is connected which protrudes forwards beyond the support structure and forms an under-ride guard for the vehicle. In addition, each longitudinal member has a front and a rear driver's cab bearing, so that a driver's cab of the commercial vehicle is supported on the longitudinal frame members of the support structure via four driver's cab bearings.

DE 198 09 209 A1 discloses a further support structure having two longitudinal members, in which a cross-member connects the front ends of the longitudinal members to each other. Furthermore, a transverse yoke is provided on the outside of the longitudinal members and a rear strut of a lower A-arm is mounted by its inner end on this transverse yoke, at each side of the vehicle. A front strut of the lower A-arm is then mounted by its inner end on the above-mentioned cross-member. At each side of the vehicle a spring element and/or shock absorber element is supported by its lower end on the lower A-arm and by its upper end on a bracing console which is formed on the transverse yoke.

DE 42 28 314 A1 discloses a three-part support structure which comprises a central support framework, a bracket-shaped front frame and a frame-type cross-bracing structure of the longitudinal members which supports the upper body parts. The central support framework extends around a drive unit including an internal combustion engine and a transmission, which is arranged essentially between the front wheels and has a downwardly open shape. The central support framework has a rear part, which is arranged behind the front axle with regard to the longitudinal direction of the vehicle. The support framework is in the form of a surrounding tubular frame and is closed by an upper cross-member. Side parts are welded onto this rear part, at both sides of the drive unit. The side parts being are formed by tubes extending approximately horizontally forwardly from an upper end of the rear part and being angled downwards before the front axle and ending approximately level with the lower end of the rear part. In order to stiffen the central support framework, the side parts are additionally connected to the rear part via struts. The upper and lower A-arms and spring elements and/or damper elements of the individual wheel suspensions are respectively mounted and supported on the central support framework.

It is the object of the present invention to provide for a support structure of the type mentioned initially, an arrangement which ensures a firm and rigid positioning for the components of the individual wheel suspension parts.

SUMMARY OF THE INVENTION

In a support structure for a commercial motor vehicle, having two spaced longitudinal frame members between which a drive unit including an internal combustion engine and a transmission is arranged and wherein the support structure has an independent wheel suspension each with an upper A-arm and a lower A-arm mounted to the support structure for supporting two wheels, a support unit is provided which, in front and behind a space for receiving the drive unit extends around the longitudinal frame members, which is fastened to the longitudinal frame members and on which at least the lower A-arms are mounted.

The invention is based on the general concept of mounting or supporting the individual wheel suspensions, or at least components thereof, on a support unit which extends all around the longitudinal frame members in the front regions thereof. By means of this design, the support structure can be provided with relatively high rigidity, in particular torsional rigidity, in the front region. As a result, the components of the individual wheel suspension, for example A-arms, which are mounted and supported in the front region and, particularly, the components which are mounted and supported on the support unit, are positioned relatively rigidly with respect to one another, so that the steering geometry operates particularly reliably during operation of the vehicle. This is of significance particularly for the steerable front-axle wheels in order to minimize wear of the suspension components and tires and to increase the vehicle safety.

According to a particularly advantageous embodiment, the support unit can have an annularly closed, ring-type front bulkhead which extends around the longitudinal frame members in front of the internal combustion engine, an annularly closed, ring-type rear bulkhead which extends around the longitudinal frame members behind the internal combustion engine, and an upwardly open lower shell which connects the front ring-type bulkhead to the rear ring-type bulkhead below the internal combustion engine, the lower shell being fastened in the region of its upper longitudinal edges to the longitudinal frame members. By means of this measure, the front region of the support structure obtains particularly high torsional rigidity, since the completely closed ring-type bulkheads can absorb torsional forces particularly well. Furthermore, the lower shell brings about an additional stiffening of the support unit and of the front region by means of a corresponding shaping, in particular by means of ribs, grooves or corrugations, In one embodiment, a transverse yoke, which surrounds the lower shell, can be inserted in a shape-integrated manner into the lower shell and can be fastened thereto. A first strut of the lower A-arm is then mounted at its inner end on this transverse yoke at each side of the vehicle between the front ring-type bulkhead and the rear ring-type bulkhead such transverse yoke may be designed as a highly rigid component. The form-fitting connection to the lower shell enables the forces acting on the transverse yoke to he transmitted in a particularly favorable manner to the lower shell and therefore to the support structure.

In another embodiment, the support unit may have a plurality of driver's cab bearings via which a driver's cab of the vehicle is supported on the support unit. In this way, the geometry of the longitudinal members can be selected independently of the driver's cab, so that more design freedom for forming variants is provided. Furthermore, a particularly high stability and rigidity of the support unit is provided which provides for good support of the driver's cab.

Further important features and advantages of the invention will become apparent from the following description of the invention on the basis of the accompanying drawings.

Preferred exemplary embodiments of the invention are illustrated in the drawings and will be explained in greater detail in the following description where identical or functionally identical components are indicated by the same reference numerals.

DESCRIPTION OF PREFERRED EMBODIMENTS

Figure 1:
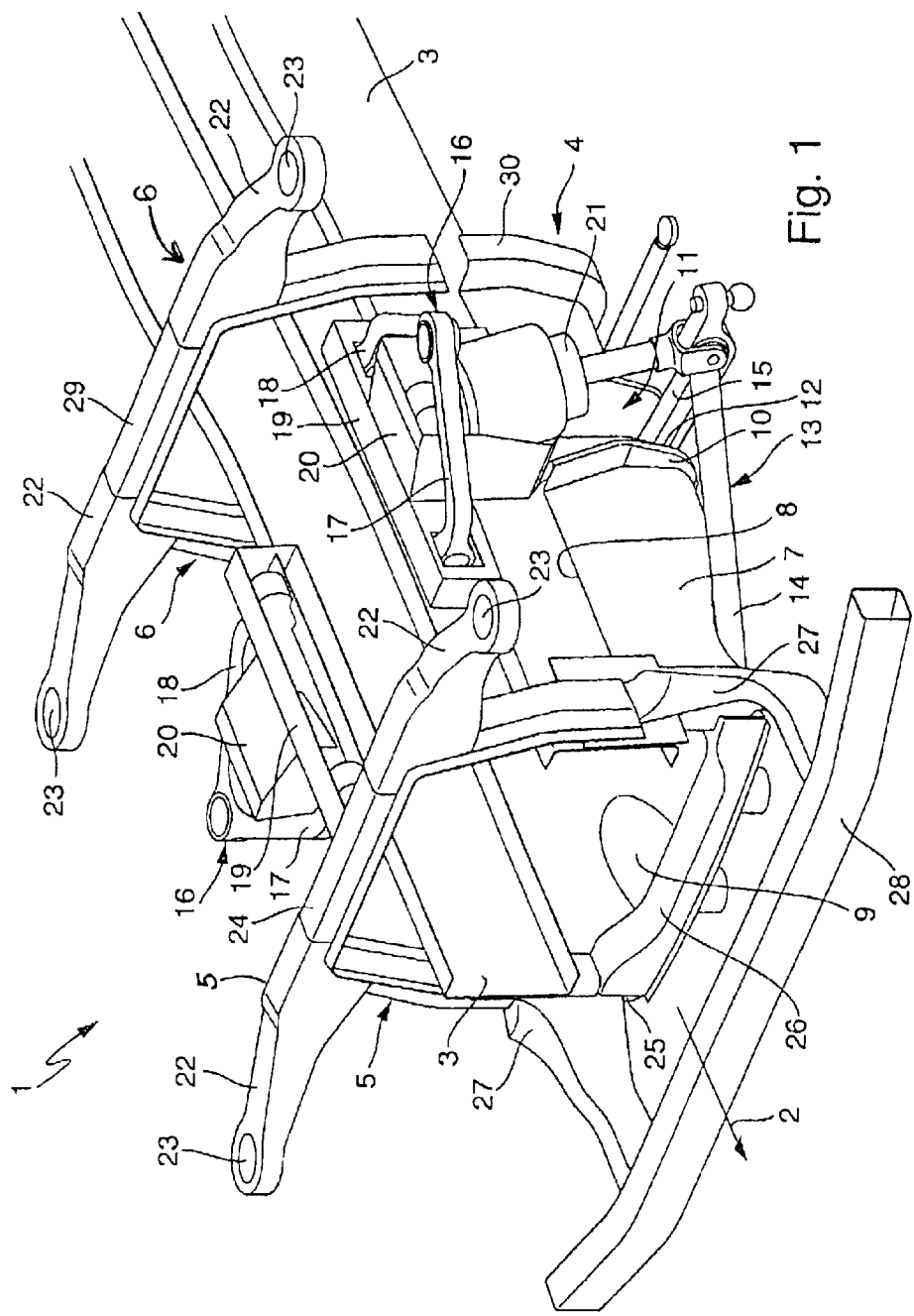
FIG. 1 is a perspective view from the front and from above of a front section of a support structure according to the invention in a first embodiment.

As shown in FIG. 1, a support structure 1 according to the invention of a commercial vehicle (otherwise not shown), in particular a truck, has two longitudinal frame members 3 which extend parallel in a longitudinal direction 2 of the vehicle, as indicated by an arrow, and which are spaced apart from each other in the transverse direction. The figures illustrate in each case a front end section of the support structure 1, which end section is also called "front region" in the following description, In this front region of the support structure 1, a drive unit (not shown here) of the commercial vehicle is arranged in the usual manner between the two longitudinal frame members 3. A drive unit of this type as a rule comprises an internal combustion engine and a transmission.

The support structure 1 has a support unit 4 which is arranged in the front region of the Support structure 1. In the preferred embodiment shown here, the support unit 4 is composed of a ring-type front bulkhead 5, with regard to the longitudinal direction 2 of the vehicle, and of a ring-type rear bulkhead 6, and of a lower shell 7. The ring-type bulkheads 5 and 6 are designed such that they are closed annularly and extend around the longitudinal frame members 3. The front ring-type bulkhead 5 is arranged in front of the internal combustion engine while the rear ring-type bulkhead 6 is situated behind the internal combustion engine. The lower shell 7 is upwardly open and extends below the internal combustion engine, the lower shell being fastened in the region of its upper longitudinal edges 8 each to one of the longitudinal frame members 3 and being connected at its front end to the ring-type front bulkhead 5 and at its rear end to the ring-type rear bulkhead 6. The trough-shaped lower shell 7 is stiffened by curved bulges 9 and transverse ribs 10. The support unit 4 already forms a relatively rigid cage by itself, and its being fastened to the longitudinal members 3, significantly increases the rigidity of the front section of the support structure 1. All in all, the front region of the support structure 1 obtains a very high riqidity, in particular torsional rigidity, by means of the support unit 4 which is fastened to the longitudinal frame members 3.

A transverse yoke 11, which surrounds at least the lower shell 7, is provided between the ring-type bulkheads 5 and 6. On its outside, the lower shell 7 has a socket 12 which is shaped in a complementary manner to the transverse yoke 11 and into which the transverse yoke 11 is inserted from the outside and in which the transverse yoke 11 is connected fixedly to the lower shell 7. This results, inter alia, in a form-fitting connection which improves a transmission of forces and moments between the transverse yoke 11 and lower shell 7.

Situated in the front region of the supporting structure 1 are two front-axle wheels (not shown here) which are mounted on the support structure 1 by means of a respective independent wheel suspensions. Each of these independent wheel suspensions has a lower A-arm 13 having a front strut 14 and a rear strut 15 and an upper A-arm 16 having a front strut 17 and a rear strut 18. The rear struts 15 of the lower A-arms 13 are in each case mounted at their inner ends on the transverse yoke 11. The front struts 14 of the lower A-arms 13 are mounted in each case at their inner ends on the front ring-type bulkhead 5. The front struts 17 and the rear struts 18 of the upper A-arms 16 are mounted at their inner ends on each side of the vehicle on a bearing console 19 which can be fastened in each case for example to a frame member. At their outer side, the bearing consoles 19 are in each case fastened to a bracing console 20 which is formed on the transverse yoke 11 or is fastened thereto. At each side of the vehicle, an upper end of a spring element and/or a shock absorber 21 is supported on this bracing console 20, the said element being connected at its lower end to the lower A-arm 13.

Support arms 22 for providing driver's cab bearings 23 at each side of the vehicle are fastened to the top of the ring-type bulkheads 5 and 6. A driver's cab (not shown) of the commercial vehicle can thus be supported on the support unit 4 via the driver's cab bearings 23.

According to FIG. 1, the ring-type front bulkhead 5 is composed of an upper bracket 24 and a lower bracket 25. While the support arms 22 are fastened to the upper bracket 24, the lower bracket 25 is fastened to the lower shell 7. In the embodiment according to FIG. 1, the lower bracket 25 is composed of a cross-member 26 and of two support consoles 27 which are connected thereto at each side of the vehicle. Both the cross-member 26 and the support consoles 27 are connected to the lower shell 7. The front struts 14 of the lower A-arms 13 are mounted to the lower side of the cross-member 26. The support consoles 27 are connected to the upper bracket 24 and protrude forwardly beyond the support structure. A lower front cross-member 28, which is expediently designed as an under-ride guard, is fastened to the front ends of the support consoles 27.

Figure 2:
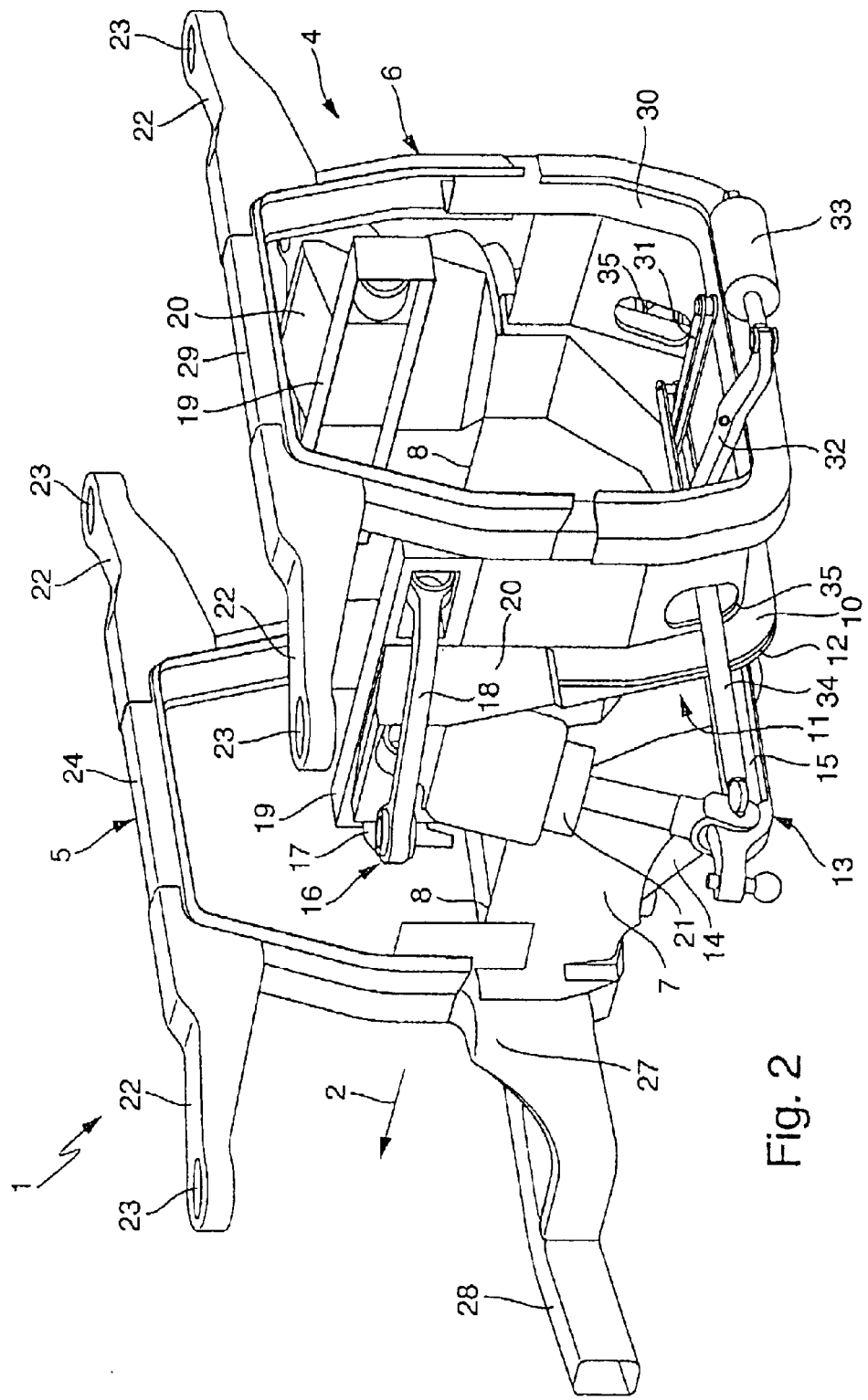
FIG. 2 shows a view as in FIG. 1, from the rear and from above.

According to FIG. 2, the rear ring-type bulkhead 6 may also be designed as a constructed ring-type bulkhead and may accordingly be composed of an upper bracket 29 and a lower bracket 30. While the upper bracket 29 also supports the two support arms 22, components of a vehicle steering system are mounted on the lower bracket 30. For example, a pair 31 and 32 of parallel links is mounted on the lower bracket 30, on the upper side thereof. The parallel link 32 which faces the viewer in FIG. 2 is designed as a double-arm lever and is connected to a first end of an actuator 33 which is supported by its second end on the lower bracket 30. This actuator 33 may, for example, form a steering actuating drive in the form of an electric actuator or a hydraulic actuator of a steer-by-wire steering system. The pair 31, 32 of parallel links drives a steering rod 34 which extends through corresponding openings 35 in the lower shell 7 and is connected to the steerable wheels.

From the view according to FIG. 2 it is clear that at least the lower bracket 30 of the ring-type rear bulkhead 6 is also inserted in a shape-integrated manner into the lower shell 7, as a result of which the transmission of forces and the rigidity of the entire arrangement are improved.

Figure 3:
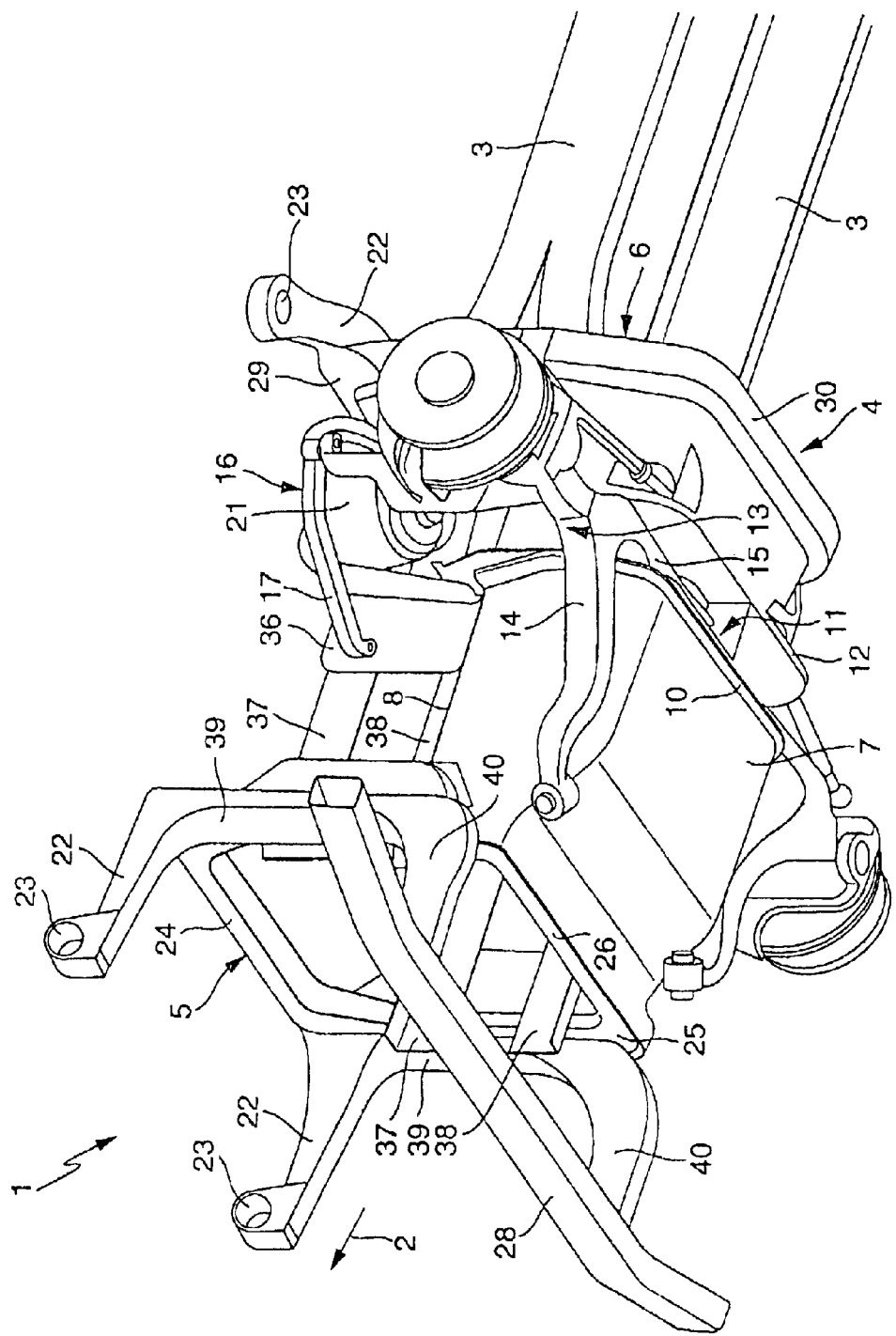
FIG. 3 shows a view, as in FIG. 1, but from the front and from below of a second embodiment.

In the case of the embodiment according to FIG. 3, at each side of the vehicle a bracing console 36 is fastened directly to the longitudinal members 3, the said bracing console combining the functions of the bracing console 20 and the bearing console 19 of the embodiment of FIGS. 1 and 2. That is to say, on the one hand, the upper end of the spring element and/or shock absorber element 21 is supported on the bracing console 36 and, on the other hand, the struts 17 and 18 of the upper A-arm 16 are mounted on the bracing console 36.

In the case of the embodiment according to FIG. 3, the rigidity in the front region of the support structure 1 is also improved by the longitudinal members 3 being forked in this front region and accordingly in each case having an upper partial longitudinal member 37 and a lower partial longitudinal member 38. The partial longitudinal members 37 and 38 of each longitudinal member 3 extend in the vertical direction spaced apart from each other and expediently parallel to each other, at least in the region of the support unit 4.

In the embodiment according to FIG. 3, a respective support console 39 is fastened to the front ring-type bulkhead 5 at each side of the vehicle. The support console has, on its upper side, the front supporting arms 22 with the front driver's cab bearings 23 and, at it its lower side, again supports, via corresponding supporting arms 40, the lower front cross-member 28, which is disposed in front of the support structure 1. These lateral support consoles 39 can be fitted onto the front ring-type bulkhead 5 as additional or separate components. It is similarly possible for these lateral support consoles 39 to form an integral part or the ring-type front bulkhead 5, which is then again a constructed ring-type bulkhead.

The support unit 1 together with the components which can be attached thereto forms a unit which can be preassembled in a pre-assembly stage and can be fastened to the longitudinal frame members 3 as an integrated unit in a final assembly stage.

What is claimed is:

1. A support structure for a commercial motor vehicle having two spaced frame members which extend in the longitudinal direction of the vehicle and between which a space is provided in a front region of said support structure for receiving a drive unit comprising an internal combustion engine and gearbox, a respective individual wheel suspension with an upper A-arm and a lower A-arm mounted to said support structure in the front region for supporting two front wheels, and a support unit arranged in the front region of said frame members in front of and behind said space for receiving the internal combustion engine, said support unit including an annularly closed, front bulkhead extending around the longitudinal frame members in front of the space for receiving said drive unit, and an annularly closed, rear bulkhead extending all around the longitudinal frame members behind the space for receiving the drive unit and being fastened to the longitudinal frame members, and at least lower A-arms of a front wheel suspension being mounted on said support unit.

2. A support structure according to claim 1, wherein said support unit has an upwardly open lower shell which is connected to the front bulkhead and to the rear bulkhead and extends below the space for receiving the drive unit, the lower shell being fastened in the region of its upper longitudinal edges to the longitudinal frame members.

3. A support structure according to claim 2, wherein between the front bulkhead and ring-type rear bulkhead a transverse yoke, which surrounds the lower shell is connected, in a shape-integrated manner, to the lower shell, said lower A-arms each having a first strut with an inner end mounted on said transverse yoke at each side of the vehicle.

4. A support structure according to claim 3, wherein at each side of the vehicle a spring and shook absorber element, is supported at its lower end on said lower A-arm and at its upper end on a bracing console which is formed on the transverse yoke and a bearing console is attached to said transverse yoke and two struts of a respective upper A-arm are mounted with their inner ends to said bearing console.

5. A support structure according to claim 2, wherein said front bulkhead is composed of an upper bracket and a lower bracket which is connected to the upper bracket and to which the lower shell is fastened and a second strut of the lower A-arm is mounted at its inner end to the lower bracket, at each side of the vehicle.

6. A support structure according to claim 5, wherein said lower bracket is composed of a cross-member on which the second strut of the lower A-arm is mounted, and of two support consoles which are connected to said cross-member at each side of the vehicle and are connected to the upper bracket and to which a lower front cross-member, which extends in front of the supporting structure, is fastened.

7. A support structure according to claim 1, wherein at cacti side of the vehicle a spring and shock absorber element is supported at its lower end on the lower A-arm and at its upper end on a bracing console which is fastened to the respective longitudinal frame member and on which two struts of the respective upper A-arm are supported at their inner ends.

8. A support structure according to claim 1, wherein said support unit has a plurality of driver's cab bearings for supporting a driver's cab of the vehicle on said support unit.

9. A support structure according to claim 6, wherein two driver's cab bearings are formed in each case on the front bulkhead and on the ring-type rear bulkhead of said support unit.

10. A support structure according to claim 1, wherein a support console is provided on the front bulkhead at each side of the vehicle, which support console carries a front driver's cab bearing at the top and to which at the bottom a lower front cross-muster is attached.

11. A support structure according to claim 1, wherein the rear bulkhead is composed of an upper bracket and a lower bracket which is connected to the upper bracket and on which components of a front wheel steering system are mounted.

12. A support structure according to claim 1, wherein the longitudinal frame members are forked open in the front region and form each an upper partial longitudinal member and a lower partial longitudinal member which extend parallel to each other, at least in the region of the support unit.

13. A support structure according to claim 1, wherein the support unit together with the components attached thereto forms a pre-assembled unit.

14. A support structure according to claim 1, wherein said support unit is designed as a rigid cage.

15. A support structure according to claim 1, wherein steering components are attached to said support unit for steering front-axle wheels.

* * * * *